US012802529B2

(12) United States Patent
Barnes et al.

(10) Patent No.: US 12,802,529 B2
(45) Date of Patent: Nov. 17, 2026

(54) PROPS ALLOCATION FOR SAME GAME PARLAYS

(71) Applicant: DK Crown Holdings Inc., Boston, MA (US)

(72) Inventors: Robert Edward Barnes, St Albans (GB); Siu Fai Hsu, London (GB); John Taylor McIvor, London (GB)

(73) Assignee: DK Crown Holdings Inc., Boston, MA (US)

( * ) Notice: Subject to any disclaimer, the term of this patent is extended or adjusted under 35 U.S.C. 154(b) by 468 days.

(21) Appl. No.: 18/217,323

(22) Filed: Jun. 30, 2023

(65) Prior Publication Data

US 2025/0006009 A1 Jan. 2, 2025

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G06Q 50/34*** | (2012.01) |
| ***G07F 17/32*** | (2006.01) |

(52) U.S. Cl.

CPC ......... *G07F 17/3288* (2013.01); *G06Q 50/34* (2013.01); *G07F 17/323* (2013.01); *G07F 17/3262* (2013.01)

(58) Field of Classification Search

CPC ................. G07F 17/32; G07F 17/3214; G07F 17/3222

USPC ..................................... 463/1, 20, 22, 25, 30

See application file for complete search history.

(56) References Cited

U.S. PATENT DOCUMENTS

| | | | | |
|---|---|---|---|---|
| 11,113,929 | B1 * | 9/2021 | Reeder | G07F 17/3244 |
| 11,847,869 | B1 * | 12/2023 | Andrzejewski | G07C 5/008 |
| 2019/0333338 | A1 * | 10/2019 | Hirsch | G07F 17/3288 |
| 2020/0133542 | A1 * | 4/2020 | Kim | G06F 3/0659 |
| 2022/0028215 | A1 * | 1/2022 | Huke | G07F 17/3244 |

* cited by examiner

*Primary Examiner* — Adetokunbo O Torimiro

(74) *Attorney, Agent, or Firm* — Wash Park IP Ltd.; John T. Kennedy

(57) ABSTRACT

A system for providing single game parlays ("SGP") includes a user device providing a user interface for selecting an SGP bet for an SGP line. A front-end server ("FES") instantiates an event simulation engine ("ESE"), a Props counter engine ("PCE"), and an SGP pricing engine. A back-end server provides betting data. The FES uses the received betting data to: determine a first probability of a future result occurring and associate a first pricing therewith; determine a second probability of a future result not occurring and associate a second pricing therewith; generate the SGP line based on the first pricing and the second pricing; and communicate the SGP line to the user interface. The ESE generates simulated results for each activity of a combination of activities for the event, outputs the simulations to the PCE, and the PCE determines the first probability and the second probability based on the simulated results.

20 Claims, 2 Drawing Sheets

PROPS ALLOCATION FOR SAME GAME PARLAYS

TECHNICAL FIELD

The technology described herein generally relates to devices, systems, and processes for allocating player activities to plays occurring during a sporting event in order to determine how to price various parlays for the sporting event.

BACKGROUND

An online gaming system ("OGS") commonly utilizes a combination of one or more gaming servers (herein, a "front-end system (FES)"—as further described below) that receive data feeds from one or more third party servers (herein, each a "back-end system (BES)"—as further described below), such as SWISH™ data provided by Swish Analytics of San Francisco, California, USA and Sportradar of St. Gallen, Switzerland. The FES commonly facilitates betting by bettors (herein, each being a "user") on one or more "events," including live events. The FES uses data provided by the BES. As used herein, an "event" is an occurrence of a future result with respect to which data currently exists, as provided by the BES, to create odds and prices for facilitating betting on the future result. For example, an event may be a basketball game with respect to which odds of team A prevailing over team B may be generated and pricing based on such odds specified such that a user may place a bet on a future result of the event, such as the winner, the final score, or other results from the basketball game.

An event may include multiple quantifiable sub-parts (herein, each an "activity") with respect to which bets may be placed. For example, a basketball game may include activities such as points, assists, blocks, steals, turnovers and the like. The activities may be tabulated as the event occurs and an OGS will often allow a user to place bets based on various future potential event activities (e.g., the score at a particular point of time later in the basketball game). The later time may be within any given time period, such as within seconds, minutes, or otherwise.

Further, a FES may allow a user to place same game parlay ("SGP") bets wherein bets are placed on multiple future activities occurring. For example, an SGP may include bets on total points scored and total assists in a given event. Today, data is provided by the BES which the FES uses to determine odds, pricing, and results for activities, SGPs, and other forms of bets.

Further, an event typically includes one or more "event entities" (herein, each a "player") that participate in the event and/or an event activity. Non-limiting examples of players include a team, an individual participant on a team, a collection of participants on a team (e.g., an NFL defensive squad), a coach of a team, or otherwise. Event activities, such as scoring activities, may be attributed to one or more players. A player's activities may be further identified in a player props line (a "Props"). The BES may provide the Props. For example, a player's scoring activity may be identified as an over/under of a given point total in a Props. For a further example, a Props may identify a player scoring greater (over) or less (under) twenty points in a game. Bets may be placed in view of the odds, other users' bets, statistical results, and other data of the player so scoring over or under the given total.

The player's activities may be further attributed to various team categories that collectively contribute to the overall performance of a team of players for the given event. For example, player A may score a basket and thereby contribute points to a team's overall score, while player B provides an assist that results in the basket being scored. Collectively, player activities result in team activities.

Commonly, a FES will provide users with various team-based betting options and various SGP player betting options. For example, a team-based betting option may be generated based on a first team model while an SGP player betting option may be generated based on a second Props model. While both models may consider total points scored by a given player by quarter, overall, or otherwise (e.g., a scoring activity by a basketball team may occur by a first player or another player), and while data regarding team-based event activities and Props is commonly readily available, correlations, and systems and methods for generating such correlations, of an individual player's contributions to the team-based event activities are needed for pricing of SGPs, which may include real-time SGPs ("RSGPs").

SUMMARY

Various implementations are described of devices, systems, and processes for on-line gaming involving independent bets and live bets.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation, a single game parlay system may include a user device having a processor executing first non-transient computer instructions which instantiate a single game parlay ("SGP") application. The SGP application provides an SGP application user interface which facilitates selection, by a user of the user device, of an SGP bet for an SGP line for a combination of activities for an event. The SGP system may further include a front-end server having a processor executing second non-transient computer instructions which instantiate an event simulation engine ("ESE"), a Props counter engine ("PCE"), and an SGP pricing engine ("SPE"). The SGP system may further include a back-end server communicating, to the front-end server, betting data for the combination of activities for the event.

For at least one implementation of an SGP system, the back-end server communicates the betting data to the front-end server on a substantially real-time basis while one or more activities of the combination of activities occur. The front-end server, on a substantially real-time basis and based on the betting data received from the back-end server performs one or more operations including determining a first probability of a future result occurring for the combination of activities, associating a first pricing with the first probability, determining a second probability of a future result not occurring for the combination of activities, associating a second pricing with the second probability, generating an SGP line based on the first pricing and the second pricing, and communicating the SGP line to SGP application instantiated on the user device. The SGP application user interface may be configured to present the SGP line to the user.

For at least one implementation of an SGP system, the ESE may perform one or more ESE operations including generating simulations of results for each activity of the combination of activities for the event and outputting the simulations to the PCE. The PCE may perform one or more PCE operations including determining the first probability and the second probability based on the simulations received from the ESE.

For at least one implementation of an SGP system, at least three simulations may be generated by the ESE and utilized by the PCE to determine at least one of the first probability and the second probability.

For at least one implementation of an SGP system, the PCE operations may further include updating, based on the betting data received from the back-end server, a counter. The counter may be an array that indicates, on a substantially real-time basis, contributions by a given participant, associated with a given player, toward a given result for at least one activity of the combination of activities for the event.

For at least one implementation of an SGP system, the PCE operations may further include generating a bet selection for the given participant based on the counter, the first probability and the second probability and outputting the bet selection to the SPE. The SPE may perform SPE operations including determining pricing for the SGP line based on the bet selection.

For at least one implementation of an SGP system, an SGP line may include, as a first activity of the combination of activities, a participant scoring a certain number of points and, as a second activity, a player winning an event. The SGP line may include odds for the first activity and the second activity occurring during the event and second odds for the first activity and the second activity not occurring during the event.

For at least one implementation of an SGP system, the front-end server may be configured to determine on a substantially real-time basis and based on the betting data received, on a substantially real-time basis, from the back-end server, an updated betting option for the SGP bet. The front-end server may further communicate, on a substantially real-time basis, the updated betting option for the SGP bet to the SGP application instantiated on the user device. The SGP application may present the updated betting option for the SGP bet as an updated SGP bet to the user in order to facilitate substantially real-time selection by the user of the updated SGP bet during the event. The updated betting option may be generated based on a counter determined by the front-end server based on real-time results associated with at least one participant in at least one of the combination of activities for the event. The updated betting option may be further generated based on at least three simulated results, determined by the front-end server based on historical results, for at least one of the combination of activities for the event. The updated betting option may be further generated based on a real-time simulated result, determined by the front-end server based on real-time betting data received from the back-end server, for the at least one of the combination of activities for the event.

For at least one implementation of an SGP system the combination of activities for the event may include at least one of a team activity for an event and a participant performance metric for the event. For at least one implementation, the SGP line may include a selection of two or more betting activity options, for a given event, selected on a predefined basis by an operator of the front-end server.

For at least one implementation of an SGP system, the SGP line may include a combination, identified by the user, of two or more betting activity options for a given event.

For at least one implementation of the present disclosure, a method for determining a bet selection for an SGP, may including performance by a front-end server of one or more operations including: simulating two combined activities for an event to determine simulated combined activity results; first determining actual results for a participant in at least one of activity of the two combined activities for the event; allocating the simulated combined activity results to the participant based on the actual results for the participant; generating, based on a result of the allocating, allocated participant results; second determining a probability of the participant achieving a future result in at least one of the two combined activities for the event based on the allocated participant results; third determining a pricing for the future result; and second generating an SGP line providing odds and returns for the participant achieving and not achieving the future result.

For at least one implementation, the method for determining a bet selection for an SGP may further include operations of: iteratively simulating the two combined activities based on real-time betting data to determine updated simulated combined activity results; and further performing the first determining, allocating, generating, second determining, third determining and second generating operations based on the real-time betting data.

For at least one implementation of the present disclosure, a computer readable medium stores non-transient computer instructions which when executed by a processor in a server instruct the server to perform one or more operations including: simulating two combined activities for an event to determine simulated combined activity results; first determining actual results for a participant in at least one of activity of the two combined activities for the event; allocating the simulated combined activity results to the participant based on the actual results for the participant; generating, based on a result of the allocating, allocated participant results; second determining a probability of the participant achieving a future result in at least one of the two combined activities for the event based on the allocated participant results; third determining a pricing for the future result; and second generating an SGP line providing odds and returns for the participant achieving and not achieving the future result.

For at least one implementation, the SGP line may include, in the two combined activities for the event, user selected activities.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
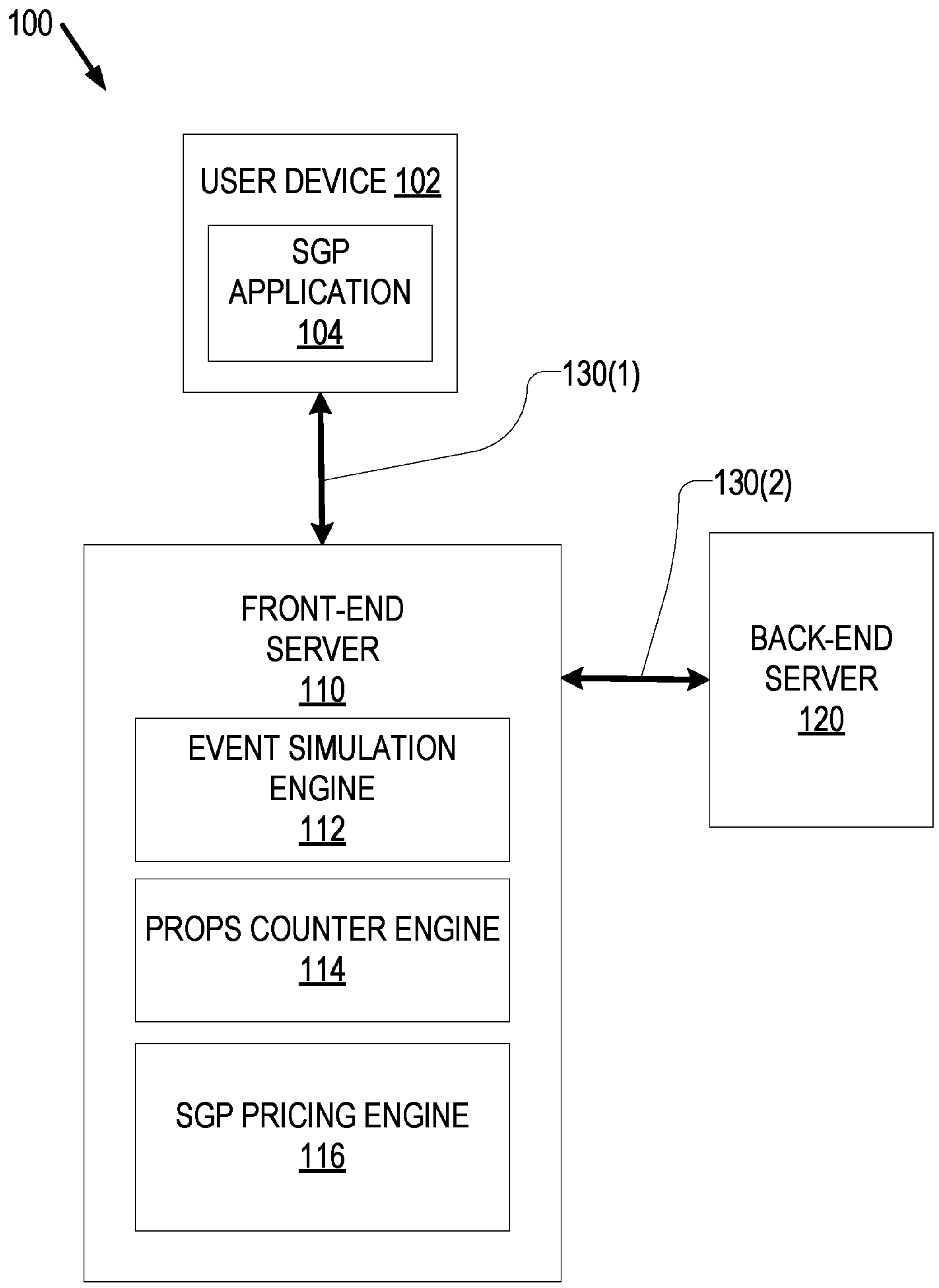
FIG. 1 is a schematic illustration of a bet processing system for independent and/or live on-line gaming and in accordance with at least one implementation of the present disclosure.

Various implementations of the present disclosure describe independent bet processing devices, systems, and processes for on-line gaming involving SGPs and RSGPs.

For at least one implementation, a system is provided which generates, based on one or more determined correlations of a player Props with a team activity, a pricing for a given SGP and/or RSGP (herein, collectively "SGPs"). For example, a first probability of a player, for a given team, scoring over a first given total amount of points may exist as a first bet while a second probability of that player's team scoring over a second given total amount of points may exist as a second bet. Given the commonality of the bets both depending on activities of the first player, pricing of the combined SGP needs to include a consideration of the correlation of the player's Props to the teams activity. To determine the correlation, the FES instantiates a correlation engine, as discussed further below, that determines the correlation of the first probability and the second probability, and based on such correlation, provides pricing for a given SGP.

"Acceptable delay" is a delay of less than a given metric, for example and not by limitation, four seconds (4 s) under normal load conditions and thirty seconds (30 s) under heavy load conditions. For example, a delay between an outputting of a given bet settlement data packet by a back-end system element and a receipt of the given bet settlement data packet by a client centric system element may be an acceptable delay if less than four seconds (4 s) during a normal load condition, e.g., during a weekly PREMIER LEAGUE™ football match, a U.S. NFL™ game or the like, while a delay of thirty seconds (30 s) may be an acceptable delay under heavy load conditions, e.g., during a SUPER BOWL™ game, the WORLD CUP™ finals, or the like. Accordingly, it is to be appreciated that an acceptable delay may vary based on current system load conditions.

For at least one implementation, an "acceptable delay" is a delay of less than a given metric, for example and not by limitation, twenty seconds (20 s). For example, a delay of less than twenty seconds (20 s) between an outputting of a given bet settlement data packet by a back-end system element and a receipt of the given bet settlement data packet by a client centric system element may be an acceptable delay.

For at least one implementation, a given delay may be determined based on a quantification of one or more networked communications characteristics occurring between a back-end system element and an OGS element. It is to be appreciated that such one or more networked communications characteristics may vary over time and with use thereof.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Back-end system" (BES) herein refers to one or more computer servers, data storage devices, applications, and the like which, singularly and/or cooperatively, address one or more back-end on-line gaming functions. As used herein, a "back-end online gaming function" (BEOGF) is one or more data processing operations and communications operations performed by one or more servers which facilitate the providing of Props, results of in-game activities, and event results. A BES may include one or more servers, data stores, communications interfaces, user interfaces, security, power, busses, and related components. The BES components may be physically, logically, virtually or otherwise grouped and/or coupled to facilitate the one or more back-end on-line gaming functions including, but not limited to, those identified herein.

"Bus" herein refers to any known and/or later arising technologies which facilitate the transfer of data within and/or between devices. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating SGPs. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), the KAFKA protocol, as provided by the Apache Software Foundation and as further described at https://kafka.apache.org/documentation/#introduction (the contents of which are incorporated herein by reference), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Content" herein refers to data that that may be presented, using a suitable presentation device, to a user in a humanly perceptible format. When presented to a human, the data becomes "information." Non-limiting examples of content include gaming images and graphics such as those related to bet placement, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" (which is also referred to herein as a "computer data") herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet has a non-transient state. For example, and not by limitation, data may take any form including as one or more applications, content, or otherwise. Instructions, as further described herein, are a form of data.

"Data store" herein refers to any device or combinations of devices configured to store data on a temporary, permanent, non-transient, or other basis. A data store is also referred to herein as a "computer readable medium." A data store may store data in any form, such as electrically, magnetically, physically, optically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient data, computer instructions, or other the like may be suitably stored in a data store. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient data with the data, while stored, being herein deemed to be non-transient data.

"Device" and "electronic device" herein refer to any known or later arising electrical device configured to, singularly and/or in combination, communicate, manipulate, output for presentation as information to a human, process, store, or otherwise utilize data. Non-limiting examples of devices include user devices and servers.

"Front-End System" (FES) herein refers to one or more user devices, servers, data storage, communications interfaces, and related components which, singularly and/or cooperatively, address one or more gaming on-line gaming functions. As used herein, a "Front-End Online gaming function" (FEOGF) is one or more data processing and/or communications operations performed by one or more user devices and/or servers which facilitate one or more of correlations of two or more activities to facilitate pricing of a given SGP. A FES may include one or more user devices, servers, data stores, communications interfaces, user interfaces, busses, and related components. The FES components may be physically, logically, virtually or otherwise grouped and/or coupled to facilitate the one or more gaming online gaming functions including, but not limited to, those identified herein.

"Instruction" (which is also referred to herein as a "computer instruction") herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Live" herein when used to refer to on-line gaming, refers to a SGP that occurs during a given event and before a given event activity occurs. A non-limiting example of a "live" bet is a bet placed during an NFL™ football game and before a given event activity occurs. For a non-limiting example, a live bet is a bet placed after an expiration of a regular time period for the football game (the event) where the bet chooses a result (the event activity) of an upcoming coin-toss (e.g., "heads" or "tails")—the coin toss determining who gets the option to receive a kick-off of the football during an overtime period. By comparison, a non-limiting example of a non-live bet (herein, also referred to as an "independent bet") is a bet placed for an activity for a given event before the event itself begins, with the bet, for example, being placed as to the ultimate winner of the event (the winner=the event activity).

"Module" herein refers to and, when claimed, recites definite structure for an electrical/electronic device that is configured to provide at least one feature and/or output signal and/or perform at least one function including the features, output signals and functions described herein. A module may provide the one or more functions using computer engines, processors, computer instructions and the like. When a feature, output signal and/or function is provided, in whole or in part, using a processor, one more software components may be used, and a given module may include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the use of electrical energy by a device. Non-limiting examples of such technologies include batteries, power converters, inductive charging components, line-power components, solar power components, and otherwise.

"Processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, micro-controllers; and the like. Processors may be implemented in single or parallel or other implementation structures, including distributed, Cloud based, and otherwise.

"Real-time" herein refers to a presentation of information to a human that occurs substantially simultaneously with a resolution of an event, such as an activity with respect to which a bet has been placed for an SGP.

"Security Component/Security" herein refers to any known or later arising processor, computer instruction, and/or combination thereof configured to secure data as communicated, processed, stored, or otherwise manipulated. Non-limiting examples of security components include those implement encryption standards, such as an Advanced Encryption Standard (AES), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Substantially simultaneous(ly)" herein refers to an absence of a greater than expected and humanly perceptible delay between a first event or condition, such as a completion of a gaming activity, and a second event or condition, such as a presentation of a bet settlement for a bet placed with respect to the gaming activity. Substantial simultancity may vary in a range of quickest to slowest expected delay, to a moderate delay, or to a longer delay. For at least one implementation, substantial simultaneity occurs within an acceptable delay (as described above).

"User Device" herein refers to a device configured for use by a human being to one or more of communicate, present, process, and store data. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

SGP Processing System 100

As shown in FIG. 1 and for at least one implementation of the present disclosure, a SGP processing system 100, may include: a user device 102, executing an SGP engine 104; a FES 110 executing an event simulation engine ("ESE") 112, a Props Counter Engine ("PCE") 114, and an SGP pricing engine ("SPE") 116; and a BES 120 providing PROPs data to the FES 110. The system 100 may be configured to facilitate operations executed by the FES 110 based on Props and other data provided by the BES 120. A first coupling 130(1) couples the user device 102 with the FES 110 and a second coupling 130(2) couples the FES 110 with the BES 120.

User Device 102

For at least one implementation, the system 100 may include one or more user devices 102. A user device 102 may include one or more device components including, but not limited to, a processor, a data store, a user interface, a communications interface, a power supply, a security component, and other components. The one or more components may be provided with the user device 102 or elsewhere; e.g., a remote data store accessible to the device by one or more couplings may be used.

The user device 102 may be configured to execute an SGP application 104. For at least one implementation, the SGP application 104 may be an online gaming application which facilitates a user's review, selection and input of one or more on-line SGP bets for one or more events, information regarding the status and final resolution of the events or elements thereof, and settlement of bets placed relative to such events and/or elements thereof.

For a non-limiting example, an event may be a given currently occurring or future occurring NFL™ game, e.g., the New England Patriots vs the Kansas City Chiefs. A first betting option for a player activity for the event may be a final score, a winner, a loser, or the like. A second betting option for an activity for the event may be a participant performance metric for one or more players (e.g., a quarterback passing for over three hundred (300) yards). The first betting option and the second betting option may be combined into an SGP. The SGP application 104 may facilitate selection of a user of two or more betting options, in an SGP, on a predefined basis (herein, a "Prepack SGP"). For at least one implementation, the SGP application 104 may facilitate live (non-predefined) SGP generation by a user, of a user device 102, identifying two or more betting activity options that are to be combined into an SGP (herein, a "Built Bet SGP").

For at least one implementation, any event and/or activity for an event may be a subject of one or more Prepack SGPs and/or Built Bet SGPs. As a given event progresses, the SGP application 104 may provide updates on existing bets, new betting options including new Prepack SGP and Built Bet SGP options, odds adjustments, and the like with respect to the event and/or activities thereof. When the event or activity thereof concludes, the first application 104 may provide the given user with updates on winnings/losses, or other information pertaining to the event or activity thereof, SGP, and other betting information. For example, an SGP that includes an activity of a player passing for over a certain number of yards, and a minimum total score for a team may be updated to indicate that a given activity has occurred (and may be designated as "in the money") while another given activity remains to be determined. The SGP application 104 may be configured to provide, for presentation to a user, any information relevant to a given bet, betting event, a betting activity, an SGP, combinations thereof, settlements of bet, account balances, or the like. Other BESs 120 may be utilized to provide data to the FES 110 to provide such betting information to a user.

FES 110

Figure 2:
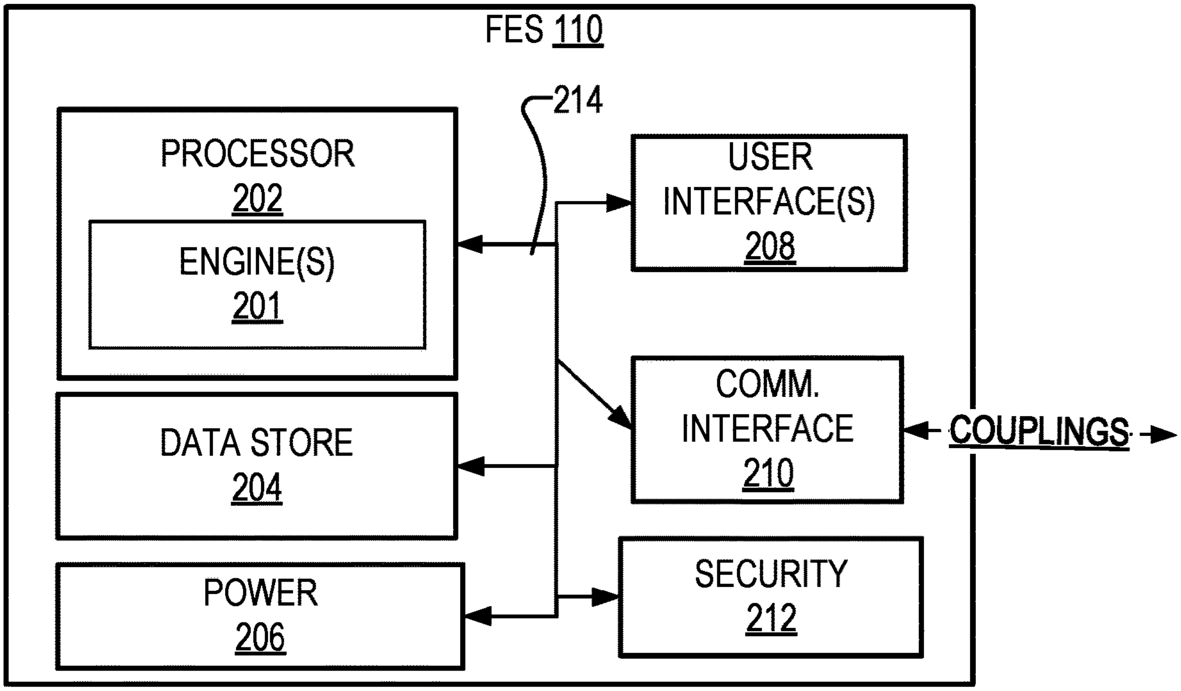
FIG. 2 is a schematic for a server in accordance with at least one implementation of the present disclosure.

As shown in FIG. 2, an FES 110 may include a processor 202 which executes non-transient computer instructions, stored in the data store 204, for executing applications, instantiating one more computer engines 201, and performing other device-related operations. The computer engines 201 instruct the server and/or other system 100 components to perform various operations which facilitate (among other operations) generation, processing, communication, storage, and the like of SGPs. Communication of data between an FES 110 and another system 100 component may utilize a communications interface 210 that respectively couples the FES 110 with the other system component(s). The FES 110 may further include one or more user interfaces 208, power 206, security 212, and other commonly utilized components for one or more computers and/or computer servers. The server components may be communicatively coupled by a bus 214.

For at least one implementation, the FES 110 may be configured to manage aspects of SGP generation, pricing, and the like. For at least one non-limiting example, the FES 110 may be configured to execute one or more computer engines with non-limiting examples including: the event simulation engine (ESE) 112 which may be configured to simulate events based on data received from one or more BESs 120; the Props counter engine (PCE) 114 which may be configured to generate counters used for allocating points to users based on PROPS data for SGPs; and the SGP pricing engine (SPE) 116 which may be configured to utilize the counters generated by the PCE 114 and based on counters received from the ESE 112 to determine pricing for a given SGP based on combinations of two or more event activities specified by an operator of the FES 110 (e.g., for a Prepack SGP) or selected by a user (e.g., for a Built Bet SGP) for a given SGP.

BES 120

For at least one implementation, the system 100 may include a BES 120. The BES 120 may include one or more servers that receive data regarding event activities (e.g., for past, present and/or future activities), compiles and processes such data into one or more event lines, Props, and/or other combinations of events and activities (herein "betting data") and provides the betting data to the FES 110. The FES 110 utilizes the betting data (in whole or in part) to facilitate generation of and pricing for SGPs, track event activities in relation to existing SGPS, and otherwise perform bet related processing activities.

Figure 3:
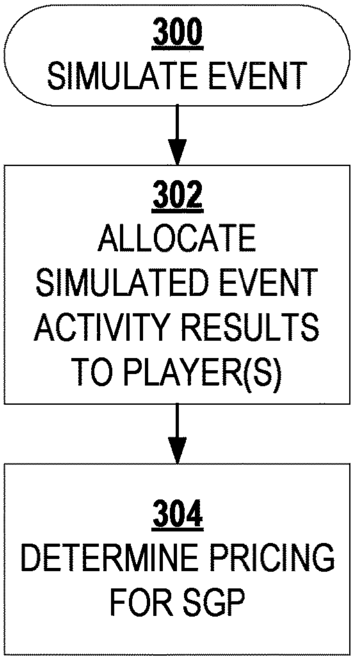
FIG. 3 is a flow chart illustrating a process for generating SGP in accordance with at least one implementation of the present disclosure.

As shown in FIG. 3 and for at least one implementation, a process for generating SGPs may include, as per Operation 300, simulating a given event. For at least one implementation, the event simulation engine (ESE) 112 may generate one or more simulations for a given event based on any number of variables, time periods, activities, players, or other betting data. The ESE 112 may generate a simulated event in advance and/or real-time based on betting data stored in one or more databases coupled to the FES 110, generated independently by the FES 110, provided by the BES 120 to the FES 110, or otherwise obtained by the FES 110. Non-limiting examples of betting data that the ESE may consider in simulating an event include individual participant status (e.g., active, inactive, injured, benched, in "foul trouble," or otherwise), event status (e.g., prior to event start, during first period, during intermission, during final period, or otherwise), weather conditions (e.g., clear skies, indoors, snowing, wind conditions, rain, or otherwise), location (e.g., neutral site, event participating team (or person) site, or otherwise), and any other data that may be relevant to simulating a given event.

It is to be appreciated that a given event may include one or more participants and conditions for the event may vary depending on the participant. Activities in an event may also vary by player, participant, or otherwise. For example, an NFL quarterback (a player and a participant) may be involved in passing touchdown activities but not involved in blocked punt activities. Betting data may be venue specific, for example, a golf event may include betting data indicative of course layout, with a given course layout being more or less favorable for a given participant versus another participant. Similarly, a given event, such as an NFL game in Buffalo, New York state in January, may be more favorable to the home team (a first player) versus an opponent team (a second player) from Florida (or a given participant thereof, e.g., a quarterback who historically underperforms in wintry weather). The ESE 112 may be configured to consider such betting data in generating a simulated event results. Any data available to the ESE 112 may be considered when generating simulated event results, event activity results, and/or event activity category results.

For at least one implementation, the ESE 112 may generate the simulated results on an interval and repeated basis while the event occurs or otherwise. For example, simulated results may be generated by the ESE 112 prior to an event commencing, at the beginning of the event, while the event occurs, or the like. The ESE 112 may generate simulation results on event activity and/or event activity category bases, such as on a possession by possession basis, on an elapsed time for the event basis, or otherwise. The simulated result basis may be predetermined, determined during the event, randomly determined, or otherwise determined in view of then available betting data. The event simulation results generated by the ESE 112 may correspond to one or more Prepack SGPS and/or Built Bet SGPs, including Built Bet SGPs generated by a user on a substantially real-time basis with a given event and/or a given event activity occurring. For example, a Built Bet SGP requested by a user based on a distance of an upcoming field goal activity (a first betting option) and in view of a total score (a second betting option) during a then-occurring NFL game.

The ESE 112 may be configured to utilize artificial intelligence and machine learning processes (herein, "AI") including known and/or later developed AI processes, to generate the simulated results.

The ESE 112 may be configured to assign simulated results to one or more event activities and/or event activity categories. For example, a simulated result may be an increase in a team's score—an example of an event activity. The ESE 112 may further categorize the increase in the team's score into one or more event activity categories. Event activity categories may be event specific, event activity specific, participant specific, or otherwise designated. For example, during an NFL game a team's score (an event activity) may increase. Such score increase may be categorized into one or more event activity categories with non-limiting examples including: passing touchdown, rushing touchdown, field goal, safety, defensive interception for a touchdown, fumble recovery for a touchdown, blocked-punt return for a touchdown, punt return for a touchdown, blocked field goal return for a touchdown, kick-off return for a touchdown, and the like. Any number of event activity categories may be used the ESE 112.

The ESE 112 may be configured to generate simulated results on any quantifiable basis for an individual participant or collection thereof. For a non-limiting example, a scoring result may be quantified as attributable to multiple participants (e.g., a given quarterback completing a touchdown pass with a given receiver), or another basis.

The ESE 112 may be configured to generate simulated results based on betting data received during a given event. Such betting data may include lines provided by SWISH, scoring results provided by Sportradar, and/or other betting data.

For at least one implementation, a series of Kalman filters may be utilized by the ESE 112 to generate the simulated results which the ESE 112 may further categorize into one more event activity categories and associated with one or more players, individual participants, and/or collection of individual participants. The simulated results may be based on betting data from historical results, current activities in a given event, on probabilities associated therewith, and the like. It is to be appreciated that such probabilities themselves may be further dependent upon other factors, such as location on a playing surface in which a given activity (leading to an increased points result occurs) or other factors, as represented by betting data available to the ESE 112 at a given time.

As per Operation 302, the event simulation engine (ESE) 112 may be configured to provide the simulated results to the Props counter engine (PCE) 114. The PCE allocates the simulated results to one or more individual participants using one or more "counters." For at least one implementation, the PCE 114 may adjust the simulated results based on actual results for a live event. The actual results may be provided as betting data by a BES 120 such as SWISH and Sportradar. The actual results and/or betting data may be provided for the given event on a team, player, participant, collection thereof, or other basis.

As used herein, a "counter" is an array (or matrix), generated by the PCE 114, that indicates whether a given individual participant associated with a given player (e.g., a team) and a given event activity category is producing a given result. For example, an event activity category of "baskets scored" may be associated with actual result of "baskets scored counter" that is specified in the betting data received by the FSE 110 from a BES 120. The counter may be associated with any given level of event activity category specificity. For a non-limiting example, counters for a basketball game may include arrays for total baskets scored, two-point baskets scored, three-point baskets scored, free-throws scored, or otherwise. During an event, the Props counter engine (PCE) 114 may count, for an individual participant, three-point baskets scored by that individual and allocate such count to a simulated result for the participant's team scoring three-point baskets or with respect to another event activity category.

The PCE 114 may generate one or more "bet selections" for a given individual participant in a given event. The bet selection(s) may be based on the counters and one or more probabilities of a given result occurring. The probabilities may be generated by the PCE 114 based on one or more simulated results generated by the ESE 112. As used herein, a "bet selection" is a probabilistically weighted counter for a given participant (e.g., a member of the team) producing a given participant result. The bet selection is determined in view of a simulated result that a given player (e.g., a team) is predicted to generate and in view of one or more simulated results for the one or more event, actual event results, and other betting data. The bet selection may be specified on an event, event activity, or event activity category basis.

For at least one implementation, a bet selection may be generated based on a probability that a given participant will be over (a "p-over" or "PO" probability) or under (a "p-under" or "PU" probability) a given SGP line. Herein, an SGP line ("SGPL") provides odds given result of an activity occurring and not occurring for a given event. For example, an SGPL may be the total points scored by a participant for a given event (e.g., player Y scoring 20 points in a basketball game between team A and team B). For at least one implementation, a PO or a PU may be determined using Equations 1-4 (with PU being shown for purposes of this description).

Equation 1

$$p_{under} = \frac{1}{|I|}\sum_{i} F_{binom}(\text{line}, N_i, p)$$

where "|I|" is number of simulations, where $N_i$ is the total number of team Props generated in an i-th simulation;

where $F_{binom}$(line, N, p) is a cumulative probability of a binomial distribution as set forth in Equation 2;

where i is index of simulation; and where p is assignment probabilities of the team props to the player.

Equation 2

$$F_{binom}(\text{line}, N, p) = \sum_{j<line} C_j^N p^j (1-p)^{N-j}$$

It is to be appreciated that a derivative of the cumulative probability ($F_{binom}$(line, N, p)) can be computed using Equation 3.

Equation 3

$$\frac{d}{dp}\left(C_j^N p^j (1-p)^{N-j}\right) = C_j^N p^j (1-p)^{N-j} \frac{(j-Np)}{p(1-p)}$$

And the probability of a new PO or PU can be computed using Newton's Method (which is also known as the Newton-Raphson method) as per Equation 4.

Equation 4

$$p_{new} = p_{old} - \frac{f(p_{old})}{f'(p_{old})}$$

For at least one implementation, a minimum of three (3) iterations of the Newton method may be used by the PCE to generate a given PO/PU bet selection for a given line.

Similarly, for at least one implementation, the PCE 114 may be configured to generate a bet selection for a player (e.g., a team) score based on averages of various scoring possibilities. For example, in a basketball game, a team (a player) or a participant may have a given scoring event, which results in points being awarded to the team, in one of three different ways: as one-point (e.g., by making a free throw) ("$N_1$"), as 2-points (e.g., by making a lay-up or two free throws) ("$N_2$"), or as 3-points (e.g., by making a three-point shot, a two-point shot and a free throw, or three free throws) ("$N_3$"). Based on historical results from past events, statistical averages can be determined, namely: $\overline{N}_1$, $\overline{N}_2$, and $\overline{N}_3$. Using Equation 4, PO or PU can be determined using a Poisson distribution as shown in Equations 5 and 6, as follows:

Equation 5

$$f_{pois}(j, \mu) = e^{-\mu}\frac{\mu^j}{j!},$$

where μ is expected occurrences of some type of scores.

Equation 6

$$p_{under} = \sum\nolimits_{j_1+2j_2+3j_3<line} f_{pois}(j_1, \overline{N}_1 p) f_{pois}(j_2, \overline{N}_2 p) f_{pois}(j_3, \overline{N}_3 p)$$

Using a derivative of the Poisson distribution and the Newton method (as per Equation 4), the probability of a given scoring event occurring can be determined and utilized in determining a given bet selection.

For at least one implementation, the PCE 114 may modify a bet selection by iteratively adjusting it, during an event based on actual event activity results, as reported on a team and individual participant basis, until an individual participant's event activity predicted results correlate with a team's (or another player's) actual event activity results for the live event (as represented by one or more counters). For example, a counter tracking three-pointers for participant A may be associated, in a bet selection, with a probability of participant A making 20% of team Y's three-pointers. This bet selection may be adjusted, during an event, when a participant B has gotten "hot" and is scoring more than an expected number of three-pointers. Given participant B's productivity, as represented by a corresponding counter for player B increasing while the counter for player A is lagging behind an expected result, the probability of participant A taking a three-pointer can be reduced 20% to another value while the probability of participant B taking a three-pointer increases and the teams overall probability of taking a three-pointer remains unchanged. Accordingly, the PCE 114 can update a given bet selection so that the simulated results are adjusted on a participant basis and in view of a team's overall results-resulting in a correlation of participant results to team results and probabilities thereof for future results that can be identified in a given bet selection and used by other processes to generate an SGP.

For another example, the bet selection indicates a probability that player X (an individual participant) will contribute to ten of the twenty baskets scored (an event activity) by team Y (a team and a player) in the simulated result of a basketball game contest between team Y versus team W (an event). Further, the bet selection may indicate a probability that player X's baskets scored include a given minimum number of three-point baskets scored (an event activity category). Based on actual event results, as indicated by one or more participant's counters, these probabilities and the accuracy of any corresponding bet selections may be increased to provide an accurate SGP, where an accurate SGP is one where actual results versus predicted results differ by less than three percent (3%).

The PCE 114 may output the bet selections as one or more simulation results to the SGP pricing engine (SPE) 116. The simulation results may be generic, market specific, or otherwise specified.

As per Operation 304, the SPE 116 may be configured to receive the bet selection from the PCE 114 and determine a pricing (e.g., an over or under bet pricing) for a given SGP based on the simulation results provided in a given bet selection. The pricing for a given SGP generated by the SPE 116 reflect correlations identified by the simulation results between individual participant results, as provided in the counter(s), and other player (e.g., team) results for a given event, event activity, and/or event activity category.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A single game parlay system comprising:
a user device having a processor executing first non-transient computer instructions which instantiate a single game parlay ("SGP") application;
wherein the SGP application provides an SGP application user interface which facilitates selection, by a user of the user device, of an SGP bet for an SGP line for a combination of activities for an event;
a front-end server having a processor executing second non-transient computer instructions which instantiate an event simulation engine ("ESE"), a Props counter engine ("PCE"), and an SGP pricing engine ("SPE"); and
a back-end server communicating, to the front-end server, real-time betting data for the combination of activities for the event; and
wherein the ESE generates two or more simulated results for the combination of activities based upon the real-time betting data received from the back-end server.

2. The single game parlay system of claim 1,
wherein the back-end server communicates the betting data to the front-end server on a substantially real-time basis while one or more activities of the combination of activities are occurring; and
wherein the front-end server, on a substantially real-time basis and based on the betting data received from the back-end server, performs operations comprising:
determining a first probability of a future result occurring for the combination of activities;
associating a first pricing with the first probability;
determining a second probability of a future result not occurring for the combination of activities;
associating a second pricing with the second probability;
generating an SGP line based on the first pricing and the second pricing; and
communicating the SGP line to the SGP application instantiated on the user device; and
wherein the SGP application user interface presents the SGP line to the user.

3. The single game parlay system of claim 2,
wherein the ESE performs ESE operations comprising:
generating simulations of results for each activity of the combination of activities for the event; and
outputting the simulations to the PCE; and
wherein the PCE performs PCE operations comprising:
determining the first probability and the second probability based on the simulations received from the ESE.

4. The single game parlay system of claim 3,
wherein at least three simulations are generated by the ESE and are utilized by the PCE to determine at least one of the first probability and the second probability.

5. The single game parlay system of claim 3,
wherein the PCE operations further comprise:
updating, based on the real-time betting data received from the back-end server, a counter.

6. The single game parlay system of claim 5,
wherein the counter is an array indicating, on a substantially real-time basis, contributions by a given participant, associated with a given player, toward a given result for at least one activity of the combination of activities for the event.

7. The single game parlay system of claim 6,
wherein the PCE operations further comprise:
generating a bet selection for the given participant based on the counter, the first probability and the second probability; and
outputting the bet selection to the SPE.

8. The single game parlay system of claim 7,
wherein the SPE performs SPE operations comprising:
determining pricing for the SGP line based on the bet selection.

9. The single game parlay system of claim 8,
wherein the SGP line includes, as a first activity of the combination of activities, a participant scoring a certain number of points and, as a second activity of the combination of activities, a participant winning an event;
wherein the SGP line includes odds for the first activity and the second activity occurring during the event; and
wherein the SGP line includes second odds for the first activity and the second activity not occurring during the event.

10. The single game parlay system of claim 2,
wherein the front-end server determines on a substantially real-time basis and based on the real-time betting data received, on a substantially real-time basis, from the back-end server, an updated betting option for the SGP bet;
wherein the front-end server communicates, on a substantially real-time basis, the updated betting option for the SGP bet to the SGP application instantiated on the user device; and
wherein the SGP application presents the updated betting option for the SGP bet as an updated SGP bet to the user in order to facilitate substantially real-time selection by the user of the updated SGP bet during the event.

11. The single game parlay system of claim 10,
wherein the updated betting option is generated based on a counter determined by the front-end server based on real-time performance metrics associated with at least one participant in at least one of the combination of activities for the event.

12. The single game parlay system of claim 11,
wherein the updated betting option is further generated based on at least three simulated results, further determined by the front-end server based on historical results, for at least one of the combination of activities for the event.

13. The single game parlay system of claim 12,
wherein the updated betting option is further generated based on a real-time simulated result, determined by the front-end server based on the real-time betting data received from the back-end server, for the at least one of the combination of activities for the event.

14. The single game parlay system of claim 1,
wherein the combination of activities for the event includes at least one of a team activity for an event and a participant performance metric for the event.

15. The single game parlay system of claim 1,
wherein the SGP line includes a selection of two or more betting activity options, for a given event, selected on a predefined basis by an operator of the front-end server.

16. The single game parlay system of claim 1, wherein the SGP line includes a combination, identified by the user, of two or more betting activity options for a given event.

17. A method, for determining a bet selection for a single game parlay (SGP), comprising operations including:

simulating, by an event simulation engine (ESE) instantiated by a front-end server (FES), two combined activities for an event to determine simulated combined activity results;

first determining, by the ESE based on real-time betting data, actual results for a participant in the at least one activity of the two combined activities for the event;

wherein a back-end server, coupled to the FES, communicates the real-time betting data to the FES on a substantially real-time basis while at least one activity of the two combined activities are occurring;

allocating, by a prop counter engine (PCE) instantiated by the FES, the simulated combined activity results to the participant based on the actual results for the participant;

generating, by the PCE, based on a result of the allocating, allocated participant results;

second determining, by the PCE, a probability of the participant achieving a future result in at least one of the two combined activities for the event based on the allocated participant results;

third determining, by a SGP pricing engine (SPE) instantiated by the FES, a pricing for the future result; and second generating, by the SPE, an SGP line providing odds and returns for the participant achieving and not achieving the future result.

18. The method of claim 17, further comprising:

iteratively simulating the two combined activities, based on the real-time betting data, for one of the two combined activities to determine updated simulated combined activity results; and further performing the first determining, allocating, generating, second determining, third determining and second generating operations based on the real-time betting data.

19. A computer readable medium storing non-transient computer instructions which, when executed by a processor in a front-end server (FES) for an online gaming system, instruct the FES to perform operations comprising:

simulating, by an event simulation engine (ESE) instantiated by the processor, at least two combined activities for an event to determine simulated combined activity results;

first determining, by the ESE and based on real-time betting data, actual results for a participant in at least one activity of the at least two combined activities for the event;

wherein a back-end server coupled to the FES communicates the real-time betting data to the FES on a substantially real-time basis while at least one activity of the at least two combined activities are occurring;

allocating, by a props counter engine (PCE) instantiated by the FES, the simulated combined activity results to the participant based on the actual results for the participant;

generating, by the PCE, based on a result of the allocating, allocated participant results;

second determining, by the PCE, a probability of the participant achieving a future result in at least one of the at least two combined activities for the event based on the allocated participant results;

third determining, by a same game parlay pricing engine (SPE) instantiated by the FES, a pricing for the future result; and second generating, by the SPE, a single game parlay (SGP) line providing odds and returns for the participant achieving and not achieving the future result.

20. The computer readable medium of claim 19, wherein the SGP line includes, in the at least two combined activities for the event, user selected activities.

* * * * *